May 17, 1966 J. A. BODET 3,251,463
PELLET PACKAGE
Filed Oct. 31, 1962 3 Sheets-Sheet 1
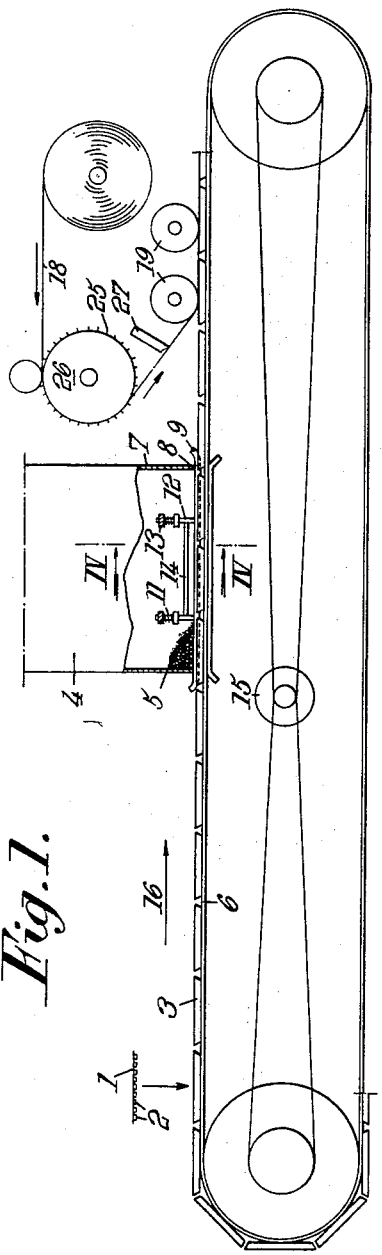
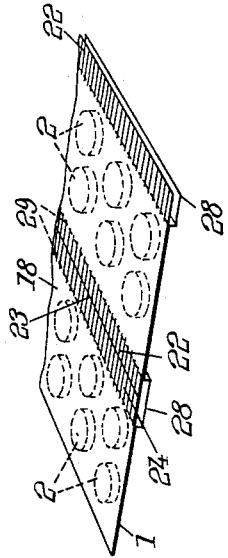
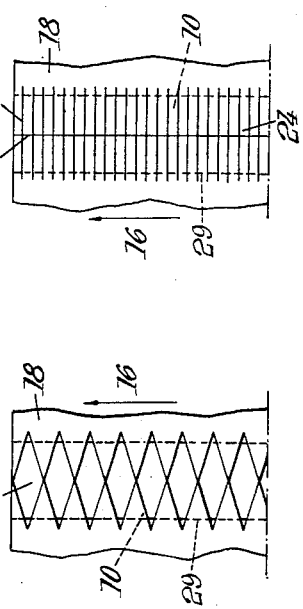

May 17, 1966  J. A. BODET  3,251,463
PELLET PACKAGE
Filed Oct. 31, 1962  3 Sheets-Sheet 2
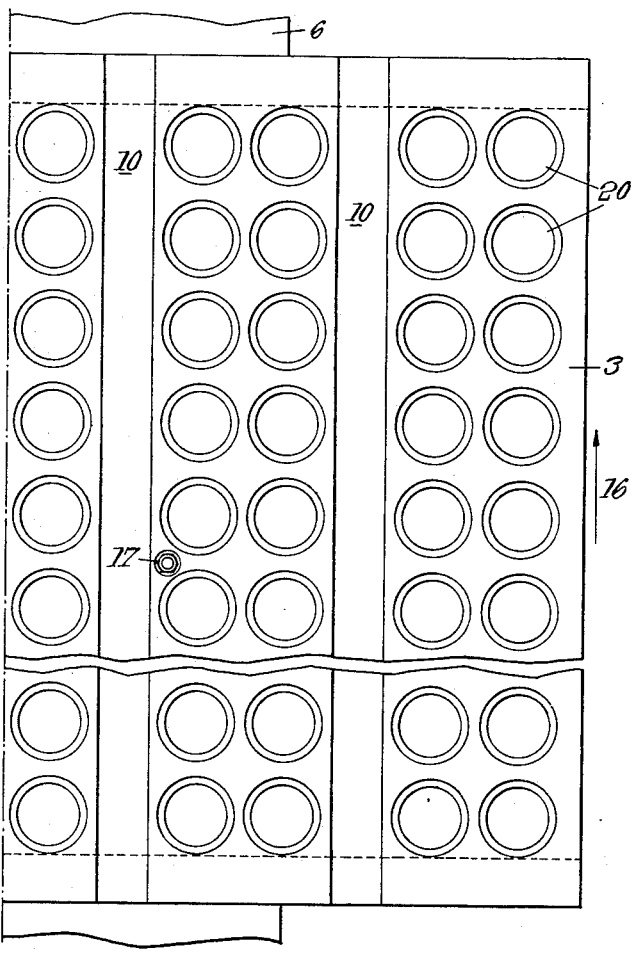
*Fig.2.*
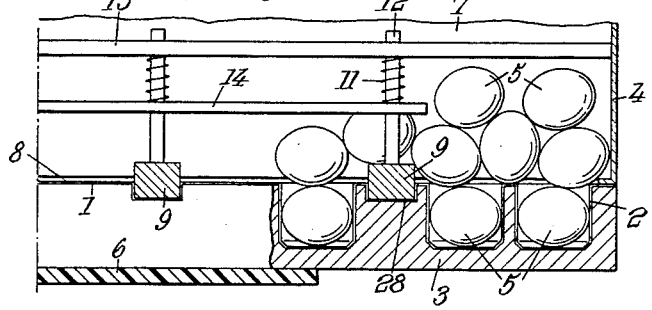
*Fig.3.*
*Fig.4.*

May 17, 1966     J. A. BODET     3,251,463
PELLET PACKAGE
Filed Oct. 31, 1962     3 Sheets-Sheet 3
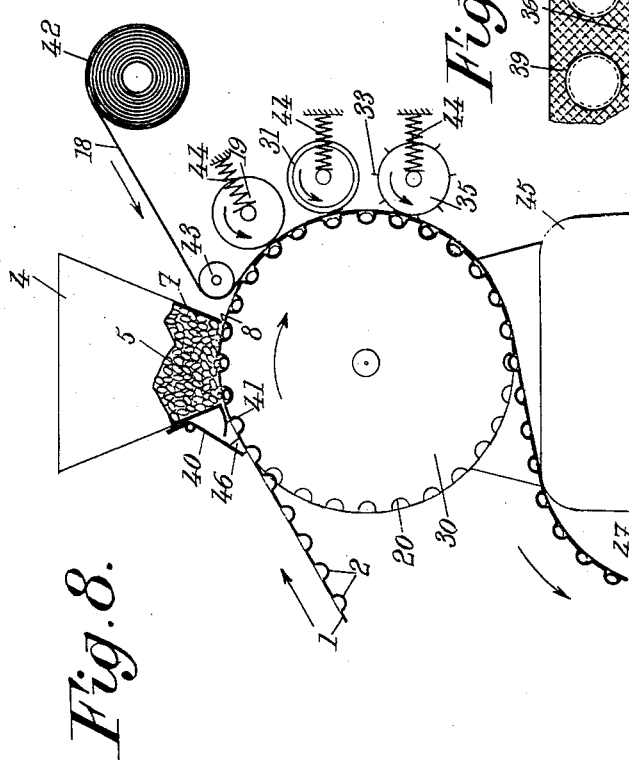
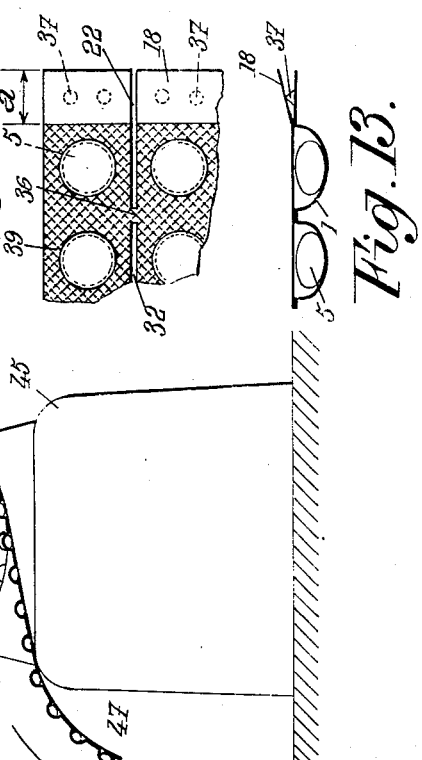

3,251,463
PELLET PACKAGE
Jean Augustin Bodet, 42 Ave. Marechal Douglas Haig,
Versailles, France
Filed Oct. 31, 1962, Ser. No. 234,324
Claims priority, application France, Nov. 4, 1961,
877,963
1 Claim. (Cl. 206—56)

The present invention relates to methods and machines for housing, in recesses provided in a sheet of plastic material, pellets or other solid bodies of small volume, either rounded or not, of a shape either definite or not, hard or not, such as pills, lonzenges, tabloids, candies, suppositories, capsules containing a liquid or even small doses of powder, etc., said solid bodies being designated thereinafter by the term "pellet" used to facilitate the description but having no limitative character.

The invention is also concerned with conditioned systems obtained by means of these methods and machines.

The chief object of my invention is to provide a method and machine which is better adapted to meet the requirements of practice, in particular to facilitate the conditioning of the pellets and to permit an easier unpacking of the conditioned pellets.

It consists chiefly—while catching the pellets between two sheets of a plastic material, one of which has been previously deformed to provide therein a plurality of recesses intended to contain said pellets, said two sheets being assembled together in a gastight manner by welding, glueing or any known way after said recesses have been provided with pellets—in providing at least one of these sheets with a succession of slots, or other elongated recesses, substantially aligned along at least one zone of this sheet, so as to form, in the finished packing, a margin for a row of pellets, and in that care is taken to prevent any adhesion between these two sheets in the region of said margin during the assembly of said sheets, in such manner as to create in this zone portions of free sheets, the holding of which is easy and the tearing away of which starts localized tearing of the sheet.

Other features of my invention will become apparent in the course of the following detailed description given merely by way of example and in which:

FIG. 1 is a diagrammatic elevational view of a conditioning device according to the present invention;

FIGS. 2 and 3 show, respectively in plane view and in end view, with portions cut away, one of the elements of this device;

FIG. 4 shows a portion of this device in section on the line IV—IV of FIG. 1, on an enlarged scale;

FIGS. 5 and 6 show two embodiments of the closing strip such as prepared and used by said device, according to the invention;

FIG. 7 shows a tablet of pellets conditioned by means of a device as illustrated by FIGS. 1-4;

FIG. 8 is a diagrammatic elevational view of another conditioning device made according to the invention;

FIG. 9 shows one of the knives comprised in this device;

FIGS. 10 and 11 partly show, respectively in plane view and in side view, a tablet of pellets obtained by means of the device of FIG. 8;

FIGS. 12 and 13 are views, similar to FIGS. 10 and 11 respectively, showing another tablet of pellets obtained by means of the device of FIG. 8.

I first deform a sheet 1 (FIG. 1) of a plastic material (polyvinyl chloride, polyethylene, polystyrene, etc.) of small thickness (for instance ranging from $\frac{1}{10}$ to $\frac{2}{10}$ of a mm.) in such manner as to form in said sheet a plurality of recesses 2, the depth of which is at least equal to the thickness of the pellets to be conditioned.

Then each of the sheets thus obtained is placed on a rigid plate 3 provided with as many housings 20 as sheet 1 is provided with recesses and corresponding therewith in shape and location.

The two operations, i.e. of shaping the sheet and applying it may be simultaneous, the deformation being for instance obtained by applying compressed air above the sheet, itself placed on the plate, preferably after heating.

The plates 3 thus covered with sheets 1 are then caused to pass through a hopper 4 (FIGS. 1 and 4) in which pellets 5 are disposed in bulk. For this purpose, in the embodiment illustrated by the drawings all the plates 3 are mounted on an endless belt 6 passing under said hopper and driven by motor 15 in the direction of arrow 16.

Assembly of plates 3 on belt 6 is effected by means of rivets or bolt and nut systems 17 extending along the middle transverse plane of every plate 3 (FIGS. 2 and 3).

As the surfaces of pellets 5 are hard and rounded said pellets have a tendency to roll upon one another under the effect of gravity. Therefore one pellet drops into each of the recesses 2 as plates 3 are passing under hopper 4.

In order to prevent any pellet other than those housed in recesses 2 from remaining on a plate 3, every hopper is provided with a wall portion 7 the lower edge of which is disposed very close to the upper face of this plate.

The height of the slot 8 left between said surface of plate 3 and the lower edge of wall portion 7 must be small enough to prevent any undesirable partial introduction of pellets 5 into this slot, which would risk damaging these pellets and jamming the device.

In order to compel the sheet 1 to pass under wall portion 7, said sheet 1 is applied upon its plate 3 by means of shoes 9 (FIGS. 1 and 4.) This result may be obtained by the mere effect of gravity but it is preferred to ensure it by the action of resilient means such as helical springs 11. In the embodiment of FIGS. 1-4 these springs are wound about vertical rods 12 slidable vertically in cross-members 13 of the hopper. Equalizing bars 14 distribute the stresses exerted by springs 11 on shoes 9 over the whole length thereof.

Said shoes 9 have curved ends and in particular curved upstream ends (i.e. the left hand ends in FIG. 1) which project from hopper 4 so as to facilitate the engagement of sheets 1 under these shoes.

In the embodiment illustrated by the drawing, shoes 9 are disposed in register with guiding grooves 10 provided in plates 3. Shoes 9 thus apply against the bottoms of these grooves 10 gutter-shaped portions 28 formed in sheet 1 and the function of which will be hereinafter explained.

When they leave hopper 4, sheets 1 are provided with one pellet 5 in every recess 2.

These recesses 2 are then closed by applying thereon, in a gastight fashion, a strip 18 (FIGS. 1 and 5–7) of a thin plastic material (for instance of a thickness of 0.07 mm.), in particular by hot welding, i.e. by passing said strip 18 between sheets 1, provided with pellets 5, and heated rollers 19 applied against said sheets. The same operation may be effected by glueing or in any other suitable way.

Such a closing is known in itself. It has the following drawback: when it is desired to secure one or several pellets, it is very difficult to tear off the portion of plastic material (sheet and strip) corresponding exactly to the desired pellet.

In order to obviate this drawback, according to the present invention, I first provide slots or other openings all along strip 18 in the areas of this strip extending along a longitudinal row of recesses 2 during the closing of these recesses 2 provided with pellets 5, said areas forming narrow and parallel tracks separated for instance from one another by the width of two lines of recesses 2.

During the closing of these recesses 2, care is taken to prevent said areas, at least in their middle portions, from adhering against sheets 1. For this purpose if closing is ensured by hot welding the corresponding areas of rollers 19 are not heated or even are cooled by a circulation of cold water or another fluid. In the application of strip 18 effected by glueing, the corresponding portions of said strip 18 are not provided with glue, and so on.

In the embodiment illustrated by FIGS. 1 to 7, wherein longitudinal gutters 28 are provided in sheets 1, the perforated zones of strip 18 are disposed opposite said gutters, which contributes and may even suffice in preventing any adhesion of said areas to said sheets.

Thus when the packing is finished, I have free strip portions (i.e. portions which have not adhered to sheet 1), the catching and pulling of which greatly facilitate a localized tearing of the article.

In order to prevent the pulling of a portion from carrying off the adjacent portion, the openings that adjoin it are preferably extended as far as the zone where the strip is glued to the sheet and even beyond this point.

The openings may be in the form of lozenges 21 juxtaposed by their apexes in the longitudinal direction of the strip (FIG. 5) or of rectangles, and so on.

In an advantageous construction said openings are constituted by a succession of transverse parallel cuts 22 (FIG. 6) connected together by a common longitudinal cut 23, i.e. form on either side of cut 23, two successions of comb teeth 24, and it suffices to hold and to tear off one of these teeth to start the desired tearing with a great facility and a high precision.

It should be noted that the transverse cuts 22 are preferably deep enough to reach, and even to extend beyond, the line 29 along which the strip is secured to the band.

In order to obtain these cuts I may have recourse to a series of transverse cutting blades 25 (FIG. 1) carried by a roller 26 along which strip 18 passes, such blades producing the transverse cuts, and the other cutting blades 27 penetrating into said strip to produce the longitudinal cut.

According to a modification the strip is delivered directly with its cuts formed therein.

After assembly of strip 18 on sheets 1, said strip is cut at the level of the separation between two successive sheets, which forms elements each provided with a number of pellets, one of these tablets being shown on FIG. 7.

According to a preferred embodiment of my invention illustrated by FIGS. 8–13, instead of applying the deformed sheets 1 upon rigid plates, they are applied against a rigid cylindrical drum 30 provided with housings 20 corresponding in position with recesses 2.

This then drum is made to rotate under a hopper 4 analogous to that above described in such manner as to provide each of its recesses with a pellet 5.

These recesses are then closed by applying on the sheet a strip 18 analogous to that above referred to, in particular by hot welding, i.e. by passing said strip between the sheet 1 still applied against drum 30 and a heated roller 19 pressed against this sheet or by glueing or again in any other desirable manner.

In order to disengage from drum 30 the sheet provided with pellet 5:

Sail sheet is cut longitudinally into as many strips as it may be desired for instance by applying against the drum a rotating cutting knife 31 or a razor blade; and Discontinuous transverse cuts are formed in said sheet parallel to every row of pellets by means of knives 33 (FIGS. 8 and 9) provided with notches at 34 and carried by a roller 35 resiliently applied against drum 30.

Each of these cuts is disposed between two contiguous rows of pellets and comprises:

A terminal slot 22 (FIGS. 9 and 12) opening into one of the longitudinal edges of the strip that has been cut;

And a succession of slots 32 (which may be in a form of portions of a straight line as illustrated or in that of mere dottings) separated from one another by small bridges 36 of plastic material corresponding to the cuts 32 provided in knives 33.

Along the edges cut with slots 22, strip 18 is not made adhesive to sheet 1 over a width $a$ so that every pair of slots 22 limits, in strip 18 and in sheet 1 respectively, two flaps separate from each other.

In order to disengage a pellet from the conditioned system above described, it suffices to hold the flap of strip 18 between the thumb and index of one hand, the flap of sheet 1 between the thumb and index of the other hand and to move the two hands away from each other. The strip is then detached from the sheet without tearing, exactly over the length determined by the two transverse cuts located on either side thereof.

In order to separate a transverse row from the next one, it suffices to tear away the small bridges 36 of plastic material, which is a particular easy operation.

In order to facilitate the initial separation of the two flaps above mentioned, it may be advantageous:

Either to give the flap carried by strip 18 a width slightly greater than that of the flap carried by sheet 1 as visible on FIGS. 10 and 11;

Or to provide on sheet 1 projections 37 (FIGS. 12 and 13) carried by said sheet and extending toward strip 18 in the portion of said sheet 1 comprised between slots 22;

Or again to provide hollows in sheet 1 opposite the free end of the flaps.

The projections 37 illustrated by FIGS. 12 and 13 may be of any desired shape size, consisting for instance of conical elements, semi-spherical bosses, dihedron-shaped ribs, crescents, etc. They are preferably formed in sheet 1 before it is placed on drum 30.

Instead of heating strip 18 over its whole width (with the exception of the areas intended to form the above mentioned flaps) to cause it to stick to sheet 1, provided with pellets, it is preferable to heat it only over limited areas surrounding the recesses, thus giving the lateral surface of the heated roller 19 the corresponding relief.

This relief may have the shape of a mere grid with square meshes such as shown at 38 on FIGS. 10 and 11.

I may also, according to a modification, give it a shape analogous to that of drum 30, the strip being then heated over its whole area with the exclusion of the circular portions thereof disposed opposite the recesses.

In order to improve adhesion, it may be advantageous to provide ribs on the heating surfaces. Such crossed ribs have been illustrated at 39 on FIG. 12.

The heating temperature (equal for instance to about 120° C.) is such that the adhesion obtained in the finished packing may be easily destroyed without tearing by mere pulling away as above referred to.

FIG. 8 further shows:

A shoe 46 urged by resilient means 40 in order to apply sheet 1 against drum 30 before it passes under hopper 4;

A guiding flap 41 to facilitate this passage;

A roller 42 for feeding strip 18 and a roller 43 for guiding said strip upstream of roller 19;

Resilient means 44 for applying roller 19 and the different knives against drum 30; and A support 45 for the whole of the device.

Of course means are to be provided for driving the respective rollers (in particular rollers 19 and 35) in exact synchronism with drum 30 so that the heating areas and the cutting areas are exactly positioned with respect to the recesses provided with pellets.

The operation of the device of FIG. 8 is particularly simple: roller 42 and hopper 4 being respectively fed with strip 18 and pellets 5, it suffices to start drum 30 rotating (together with rotating means 19, 31 and 35) to heat roller 19 and to feed a sheet 1 at the inlet of the hopper automatically to collect, some seconds later, strips fitted with pellets, which detach from the drum merely by the action of gravity at 47. Furthermore each of the pellets thus conditioned may be detached from the strip that contains it in an easy, quick and clean manner above described.

The rate of conditioning may be very high and reach a value of 200,000 pellets per hour or even more with a drum 30 having a diameter of about 50 cm. comprising side by side ten circular tracks of recesses spaced from one another by 1.5 cm., the rate of displacement of said rows being of about 5 meters per minutes.

In a general manner while I have, in the above description, disclosed what I deem to be a practical and efficient embodiment of my invention, I do not wish to be limited thereto as there might be changes made in the arrangement, disposition and form of the parts without departing from the principle of my invention as comprehended within the scope of the appended claim.

In particular the pellets in bulk might be replaced by tablets thinner and more brittle, distributed by nozzles opening above the recesses, which would facilitate their control.

The pellets might consist of solids, of small volume of definite shape or not, such as suppositories, doses of powder and so on.

What I claim is:

A pellet package consisting of two sheets of flexible material adherently secured to each other, a least one of said sheets being deformed to form a plurality of recesses which open towards the other sheet, said recesses being disposed in parallel rows, a pellet in each of said recesses, said sheets including freely separable lateral margin portions, said margin portions being provided with slots extending parallel to said rows and extending to the free edges of the margin portion defining individual peeling strips, at least one of said sheets in said margin portion including projections extending from said one sheet toward the other sheet in said peeling strips to maintain the sheets apart from one another at said margin portions, said respective recesses being distributed in checkered fashion, each peeling strip being inclusive of a respective row of recesses and having the width of such a row, at least one of said sheets being provided with further slots in alignment with the first said slots along the length of the strips, on either side of a respective row, said further slots being discontinuous in each line providing unperforated intervals between adjacent slots maintaining the form of the package while enabling ready separation of the sheets along the strips, each line including one interval for each recess.

References Cited by the Examiner

UNITED STATES PATENTS

| 1,985,882 | 1/1935 | Adler | 206—56 |
| 2,069,334 | 2/1937 | Salfisberg | 206—56 |
| 2,612,738 | 10/1952 | Salfisberg | 53—29 |
| 2,998,880 | 9/1961 | Ladd | 206—63.3 |
| 3,092,940 | 6/1963 | David | 53—29 |
| 3,113,715 | 12/1963 | Pangrac | 229—53 |

FOREIGN PATENTS 1,010,631  3/1952  France.

THERON E. CONDON, *Primary Examiner.*

TRAVIS S. McGHEE, LOUIS G. MANCENE,
*Examiners.*

A. E. FOURNIER, W. T. DIXSON, *Assistant Examiners.*